(12) United States Patent
Hanna

(10) Patent No.: US 9,157,332 B2
(45) Date of Patent: Oct. 13, 2015

(54) HYDRODYNAMIC ENERGY GENERATION SYSTEM WITH ENERGY RECOVERY AND LEVERING SUBSYSTEM

(71) Applicant: Ibrahim Hanna, Miami, FL (US)

(72) Inventor: Ibrahim Hanna, Miami, FL (US)

( * ) Notice: Subject to any disclaimer, the term of this patent is extended or adjusted under 35 U.S.C. 154(b) by 0 days.

(21) Appl. No.: 14/664,000

(22) Filed: Mar. 20, 2015

(65) Prior Publication Data

US 2015/0198057 A1 Jul. 16, 2015

Related U.S. Application Data

(63) Continuation-in-part of application No. 14/258,716, filed on Apr. 22, 2014, which is a continuation-in-part of application No. 14/195,133, filed on Mar. 3, 2014.

(60) Provisional application No. 61/925,828, filed on Jan. 10, 2014.

(51) Int. Cl.
| | |
|---|---|
| *F01D 15/00* | (2006.01) |
| *F01D 15/10* | (2006.01) |
| *F03B 17/00* | (2006.01) |
| *F03B 13/06* | (2006.01) |
| *F03B 17/02* | (2006.01) |

(52) U.S. Cl.
CPC .............. *F01D 15/10* (2013.01); *F03B 13/06* (2013.01); *F03B 17/005* (2013.01); *F03B 17/02* (2013.01); *F05B 2240/97* (2013.01); *Y10S 415/916* (2013.01)

(58) Field of Classification Search
CPC ........ H02K 7/1823; H02K 7/18; Y02E 10/22; Y02E 10/28; F01D 15/10

USPC .......... 415/1, 182.1, 201; 290/52, 53, 54, 43, 290/1 R; 60/398, 496, 675; 417/337
See application file for complete search history.

(56) References Cited

U.S. PATENT DOCUMENTS

| | | | | |
|---|---|---|---|---|
| 4,382,365 | A * | 5/1983 | Kira et al. | 60/675 |
| 4,698,516 | A * | 10/1987 | Thompson | 290/54 |
| 7,329,962 | B2 | 2/2008 | Alstot et al. | 290/54 |
| RE40,407 | E | 7/2008 | Natarius | 210/788 |
| 8,127,542 | B1 * | 3/2012 | Dolcimascolo | 60/398 |
| 8,400,007 | B2 | 3/2013 | Campbell | 290/54 |
| 2007/0284883 | A1 | 12/2007 | Cafariello | 290/54 |
| 2009/0273189 | A1 | 11/2009 | Iglesia | 290/54 |
| 2010/0072754 | A1 * | 3/2010 | Huang | 290/54 |
| 2010/0135766 | A1 * | 6/2010 | Allaei | 415/1 |
| 2010/0253080 | A1 * | 10/2010 | DeAngeles | 290/52 |
| 2011/0260460 | A1 * | 10/2011 | Rovinsky | 290/54 |
| 2011/0272498 | A1 | 11/2011 | Li et al. | 239/583 |

(Continued)

*Primary Examiner* — Tulsidas C Patel
*Assistant Examiner* — Sean Gugger
(74) *Attorney, Agent, or Firm* — Mark Terry

(57) ABSTRACT

The hydrodynamic energy generation system includes a vertically aligned housing comprising a hollow interior and an opening at a top, wherein the housing is at least partially submerged in a body of water, a valve coupled to a top of the housing for regulating an amount of water that enters the opening at the top and falls into the housing, wherein the valve is located under a water line, a water wheel coupled to a generator that produces electrical power when the water wheel is moved by water that falls into the housing, a reservoir located below the water wheel for holding water, a pump for removing water from the reservoir, and a water jet for receiving water from the pump and jettisoning water towards the water wheel, so as to move the water wheel and cause the generator to produce electrical power.

18 Claims, 12 Drawing Sheets

(56) References Cited

U.S. PATENT DOCUMENTS

| | | | |
|---|---|---|---|
| 2012/0074703 A1* | 3/2012 | Lin | 290/54 |
| 2012/0187692 A1* | 7/2012 | Walton et al. | 290/54 |
| 2012/0200156 A1 | 8/2012 | Weller | 307/21 |
| 2012/0207588 A1* | 8/2012 | Schmidt | 415/121.3 |
| 2013/0341928 A1* | 12/2013 | Steelberg et al. | 290/53 |
| 2014/0309067 A1 | 10/2014 | Ludas et al. | 475/36 |

* cited by examiner

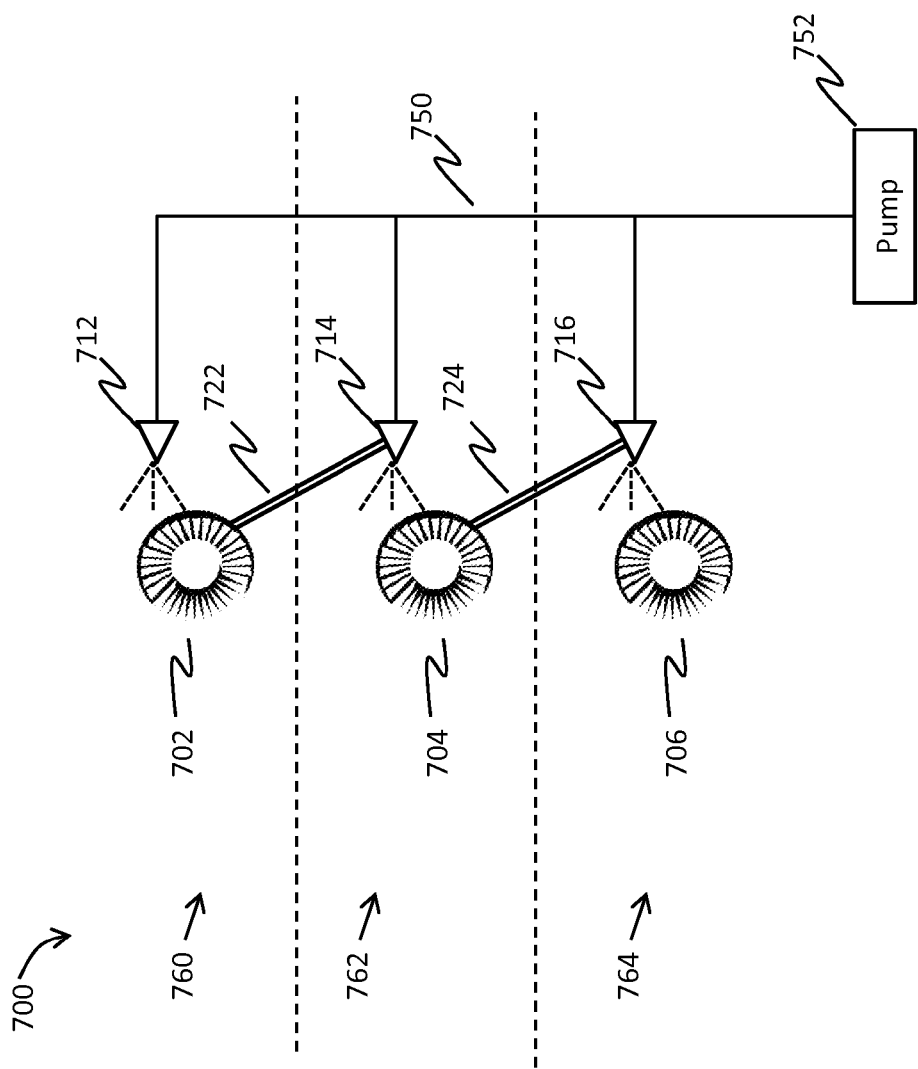

HYDRODYNAMIC ENERGY GENERATION SYSTEM WITH ENERGY RECOVERY AND LEVERING SUBSYSTEM

CROSS-REFERENCE TO RELATED APPLICATIONS

This patent application is a continuation in part and claims priority to utility patent application Ser. No. 14/258,716 filed Apr. 22, 2014 and entitled "Hydrodynamic Energy Generation System with Energy Recovery and Levering System", which is a continuation in part and claims priority to utility patent application Ser. No. 14/195,133 filed Mar. 3, 2014 and entitled "Hydrodynamic Energy Generation System", which claims priority to provisional patent application No. 61/925,828 filed Jan. 10, 2014 and entitled "Hydrodynamic Energy Generation System." Application Ser. Nos. 14/258,716, 14/195,133 and 61/925,828 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of energy production, and more specifically relates to the field of energy production via hydrodynamic sources.

BACKGROUND OF THE INVENTION

A power generating station is an industrial machine or plant for the generation of mechanical, hydrodynamic or electric power. At the center of nearly all power generating stations is a generator, which typically includes a rotating machine that converts mechanical power into electrical power by creating relative motion between a magnetic field and a conductor. The energy source harnessed to turn the generator varies widely—from moving water and wind, to fossil fuels (such as coal, oil, and natural gas) and nuclear material. In recent times, however, due to the decreasing reserves of fossil fuels and the environmental impact of their use in power generation, cleaner alternatives for the generation of power have become more popular.

Cleaner alternatives for power generation include solar, wind, wave, and geothermal sources. Despite the fact that they are considerably more environmentally-friendly, these alternative power generation techniques have struggled to gain widespread acceptance due to their inefficiencies in generating power, their high cost to establish in comparison to existing fossil fuel technology and their lack of aesthetic appeal (such as wind farms). Another reason for the lack of popularity of cleaner power generation alternatives is the political power of the existing power generation entities. Oil companies, for example, have significant political sway in the United States, as well as abroad, and have resisted attempts to introduce alternative fuel sources into the power generation industry.

One of the most promising clean power generation alternatives is hydroelectric power. Hydroelectricity refers to electricity generated by hydropower, i.e., the production of electrical power through the use of the gravitational force of falling, or hydrodynamic force of flowing, water. Although hydroelectric power is one of the cleanest and most environmentally-friendly sources of energy, it also has the capability to alter or damage its surroundings. In some forms of present use, among the main problems that have been demonstrated by hydroelectric power is significant change in water quality. Because of the nature of hydroelectric systems, the water used in the system can often take on a higher temperature, lose oxygen content, experience siltation, and gain in phosphorus and nitrogen content. This can have a major impact on aquatic life near the region of a hydroelectric plant.

Another major problem with hydroelectric power is the obstruction of a body of water, such as a river, for aquatic life. When used in the context of a flowing body of water, such as a river, a hydroelectric plant can obstruct the natural migration of aquatic life. Salmon, for example, which migrate upstream to spawn every year, are especially impacted by hydroelectric dams.

Therefore, a need exists to overcome the problems with the prior art as discussed above, and particularly for a more efficient way of providing cleaner and more environmentally friendly alternatives for power generation, namely, hydroelectric power generation.

SUMMARY OF THE INVENTION

A hydrodynamic energy generation system is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the hydrodynamic energy generation system includes a vertically aligned housing comprising a hollow interior and an opening at a top, wherein the housing is at least partially submerged in a body of water, a valve coupled to a top of the housing for regulating an amount of water that enters the opening at the top and falls into the housing, wherein the valve is located at or under a water line, a first water wheel located below the valve and within the housing, wherein the first water wheel is mechanically coupled to a first generator that produces electrical power when the first water wheel is moved by water that falls into the housing, a reservoir located below the first water wheel and within the housing, wherein the reservoir holds the water that has travelled via the first water wheel, at least one pump for removing water from the reservoir, and a first water jet for receiving water from the at least one pump and jettisoning water towards the first water wheel, so as to move the first water wheel and cause the first generator to produce electrical power. In another embodiment, the hydrodynamic energy generation system includes a control processor coupled with the valve, the at least one pump, the first generator and the first water jet, the control processor for controlling said valve, the at least one pump and the first water jet.

The foregoing and other features and advantages will be apparent from the following more particular description of the preferred embodiments, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 7A is a block diagram illustrating the energy recovery and levering subsystem of a hydrodynamic energy generation system, in accordance with an alternative embodiment.

DETAILED DESCRIPTION

Figure 1:
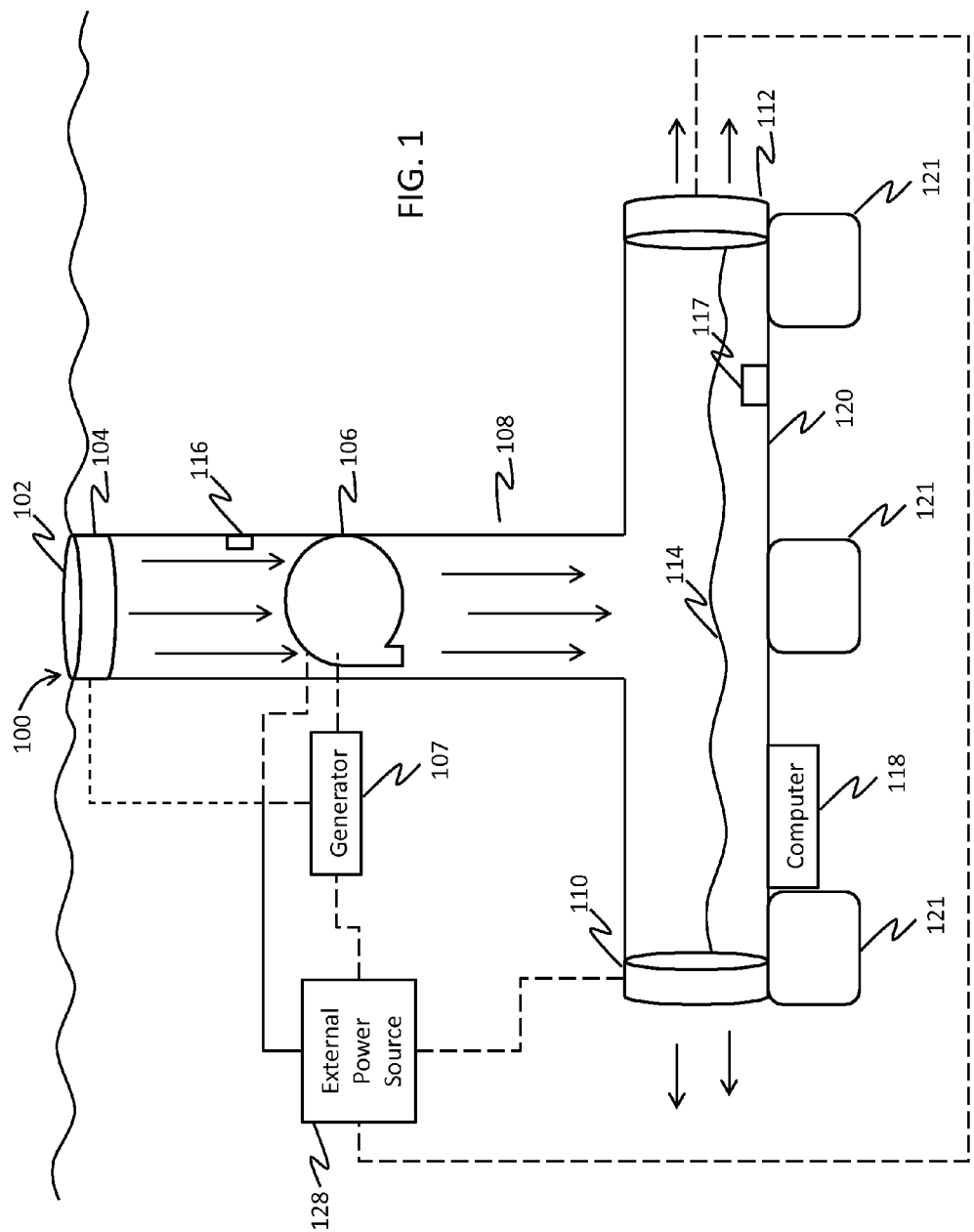
FIG. 1 is a block diagram illustrating the hydrodynamic energy generation system, in accordance with one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, a hydrodynamic energy generation system is disclosed that overcomes the problems with the prior art as discussed above, by providing an energy generation system that utilizes clean, renewable energy and does not produce waste. As an improvement over conventional energy generation systems, the disclosed systems allows for the production of energy using falling water that is plentiful and renewable, without the drawbacks of burning fossil fuels—i.e., waste products. Also, the hydrodynamic energy generation system provides a system with a minimal number of component parts, thereby reducing the potential for failure or malfunction of its combination parts. Further, the minimal number of component parts allows for quick and inexpensive fabrication of the combination parts, thereby resulting in an economical system. Lastly, the hydrodynamic energy generation system is easily maneuverable, easily transportable, inexpensive to manufacture and lightweight in its physical characteristics.

The embodiments of the hydrodynamic energy generation system will be described heretofore with reference to FIGS. 1 through 10 below. FIG. 1 is a block diagram illustrating the hydrodynamic energy generation system 100, in accordance with one embodiment. The hydrodynamic energy generation system 100, which is fully or partially submerged in a body of water (such as an ocean, lake or river) may be composed of a vertically aligned element 108, otherwise known as a housing, comprising a hollow interior and an opening 102 at the top. The vertically aligned element 108 may comprise a tubular structure, and may, alternatively, integrate a horizontal part or different portions in a variety of sequences or configurations. The opening 102 and/or valve 104 may be located at or under the water line of the body of water in which the system 100 is submerged, so as to allow water to enter the top of the housing 108.

The hydrodynamic energy generation 100 may further include a valve 104 coupled to the top of the vertical element 108 for regulating an amount of water that enters the opening 102 at the top. The valve 104 may comprise one or more valves for regulating flow of water, such as a ball valve, a butterfly valve, a gate valve, a globe valve, a needle valve, a spool valve or a safety valve. The valve 104 may further be a check valve or foot valve, which are unidirectional valves that only allow water to flow in one direction.

The hydrodynamic energy generation 100 may further include a water wheel and/or turbine 106 (chained or otherwise mechanically coupled with a generator 107), wherein the water wheel and/or turbine is located below the valve 104. The generator 107 produces electrical power when the water wheel and/or turbine 106 is moved by the water entering the opening 102 and falling into the interior of the housing 108. The water wheel and/or turbine 106 may comprise a rotating machine that converts hydrodynamic power into mechanical power that drives the generator 107 (and/or another set of water pumps), which produces electrical power. The amount of power generated by the generator 107 is proportional to the amount of water falling into the housing 108 and is further proportional to the distance from the opening 102 to the turbine 106.

The hydrodynamic energy system may further include a reservoir 120 located below the water wheel 106, wherein the reservoir 120 holds water that has travelled via the water wheel 106. The reservoir 120 may comprise a volume that extends horizontally past a horizontal width of the housing 108. For example, FIG. 1 shows that reservoir 120 is a horizontally aligned tubular structure that extends in the horizontal direction far past the horizontal width of the vertically aligned housing 108.

The system may further include at least one pump 110 for jettisoning water from the reservoir 120. The at least one pump 110 may be located in a horizontal direction past a horizontal width of the housing 108. See FIG. 1, which shows that the pump 110 is located at the far left, in the horizontal direction, far past the horizontal width of the vertically aligned housing 108. The purpose of pump 110 is to maintain a predefined amount of water 114 in the reservoir 120, so as to neutralize, or substantially reduce or eliminate buoyancy forces acting on the system 100. The pump 110 operates so as to not allow the amount of water 114 to rise over a predefined horizontal line, for the purpose of counteracting buoyancy forces acting on the system 100. Another purpose or function of pump 110 is to ensure that the amount of water being pumped out of the housing 108 is equal to or greater than the amount of water entering the housing 108 via the opening 102, so as to avoid a situation where the entire volume of housing 108 is filled with water. Another purpose or function of pump 110 may be to ensure that the amount of energy exerted on the water being pumped out of the housing 108 is enough to maintain water flow equal to or greater than the amount of water entering the housing 108 via the opening 102, so as to avoid a situation where the entire volume of housing 108 is filled with water, thereby causing a decrease in efficiency.

FIG. 1 also shows another pump 112 for jettisoning water from the reservoir 120. The pump 112 may also be located in a horizontal direction past a horizontal width of the housing 108. See FIG. 1, which shows that the pump 112 is located at the far right, in the horizontal direction, far past the horizontal width of the vertically aligned housing 108. The purpose of pump 112 is similar or identical to pump 110 and this pump 112 may work in conjunction with pump 110.

The pumps 110, 112 (as well as generator 107 and wheel 106) may further be communicatively coupled (via a conductive coupling) with generator 107 and an external power source 128, which would be an external source of power, such as the utility power grid or another power producer. The pumps 110, 112 or any other item of system 100 that requires electricity can be powered via an exterior power source, which is conductively coupled to said pumps or other item. In the event the system 100 is a net consumer of energy, the system 100 has the utility identical in certain dynamics to a pumped storage hydroelectricity system. However the disclosed system is different in that, due to the installation under the surface of a body of water, pumping water does not require more energy, when the elevation between the level of storage (or water return level) and the level of pumping is increased. As is well known in the art, pumped-storage hydroelectricity is a net consumer of energy and yet has a known utility. Pumped-storage hydroelectricity (PSH) is a type of hydroelectric energy storage used by electric power systems for load balancing. The method stores energy in the form of gravitational potential energy of water, pumped from a lower elevation reservoir. Low-cost off-peak electric power is used to run the pumps. During periods of high electrical demand, turbines produce electric power. Although the losses of the pumping process makes the plant a net consumer of energy overall, the system increases revenue by selling more electricity during periods of peak demand, when electricity prices are highest. This same utility may apply to system 100.

In above ground installations of PSH systems, pumping water to higher levels of storage consumes higher energy, and remains at all times energy net negative. In the disclosed system, however, while higher energy in deeper systems may be obtained from water falling through opening 102, pumping a fixed amount of water out of the system consumes a similar amount of energy at different levels of depth, thereby giving rise to the potential that at a certain depth, the energy produced may exceed energy consumed. In the disclosed system, if the falling water produces more energy as we the system is deployed in a deeper depth and when discharging this falling water consumes the same amount of energy regardless of depth, then the disclosed system may at a certain depth reach the level of being a net producer of energy.

The system 100 may further include a first sensor 116 for detecting water flow as water falls into the housing 108 via the opening 102. The first sensor 116 may be an accelerometer, a water flow sensor, a temperature sensor, a conductance measurement device, a barometer, a pressure sensor, etc. The system 100 may also include a second sensor 117 for detecting an amount of water 114 in the reservoir 120. The second sensor 117 may be an accelerometer, a water flow sensor, a temperature sensor, a conductance measurement device, a barometer, a pressure sensor, etc. In FIG. 1, the first and second sensors 116, 117 may be one integrated unit or may comprise a plurality of sensors distributed throughout the system 100 in different locations.

Figure 2:
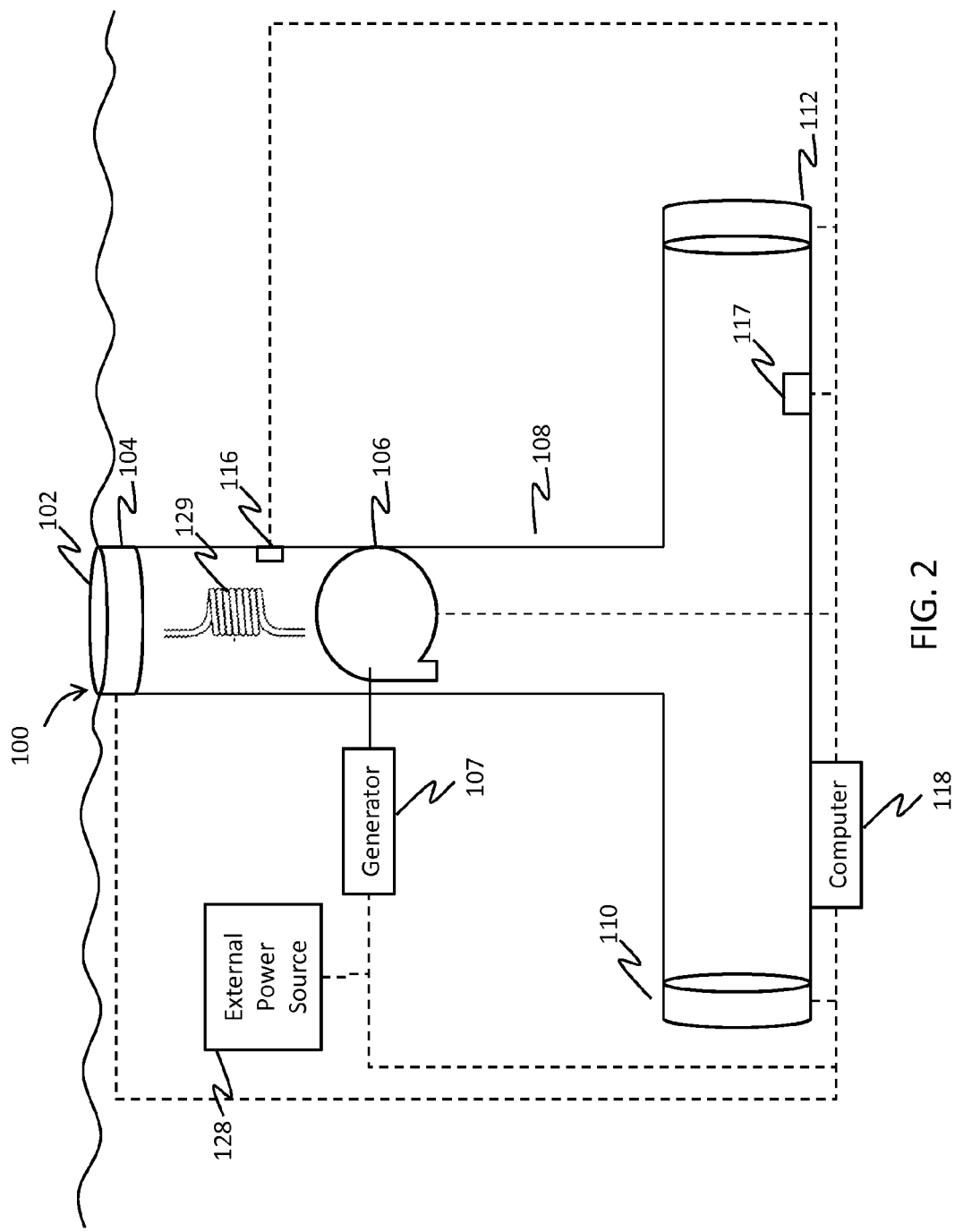
FIG. 2 is a block diagram illustrating the hydrodynamic energy generation system, in accordance with an alternative embodiment.

The hydrodynamic energy generation 100 may further include a computer or control processor 118. As shown in FIG. 2, the computer 118 may be communicatively coupled with valve 104, generator 107, water wheel or turbine 106, pump 110, pump 112, and sensors 116, 117, as well as power source 128. In one embodiment, processor 118 may be a central processing unit, microprocessor, integrated circuit, programmable device or computing device, as defined below with reference to FIG. 4. The control processor 118 is configured for reading data from the first and second sensors 116, 117, generator 107, and turbine 106 and sending control signals to the valve 104 and the pumps 110, 112, wherein the control signals are configured to activate the valve 104 to regulate an amount of water that enters the opening 102 at the top of housing 108, and to activate the pumps 110, 112 to regulate an amount of water maintained in the reservoir 120, such that the system 100 is maintained at neutral buoyancy. The control signals sent to the valve 104 and the pumps 110, 112, may further be configured such that the amount of water 114 within reservoir 120 is not to be allowed to rise over a predefined line, for the purpose of substantially reducing or eliminating buoyancy forces acting the system 100 due to the body of water in which the system 100 is submerged. The control signals sent to the valve 104 and the pumps 110, 112, may also be configured such that the amount of water being pumped out of the housing 108 is equal to or greater than the amount of water entering the housing 108 via the opening 102, so as to avoid a situation where the entire volume of housing 108 is filled with water.

The hydrodynamic energy generation 100 may further be mechanically stationed and fixed steady in place, such as attaching the system to one or more concrete pads, metal constructions or any other fixed support 121, as shown in FIG. 1. In one embodiment, the housing 108 includes a filter coupled to the valve 102 at the top of the housing 108, wherein the filter eliminates unwanted debris from the water flowing through the valve 104. It is desirable to eliminate the intake of debris and other unwanted material so as to reduce or eliminate clogs and other malfunctions. In another embodiment, the housing 108 includes a vertically-aligned spiral tubular structure 129 located below the valve 104 at the top of the housing, wherein the spiral tubular structure 129 provides a path for water falling into the housing 108. The vertically-aligned spiral tubular structure 129 may serve to accelerate and organized the water flow, such that the subject water may rotate and acquire more speed and/or torque as it travels through the spiral.

Figure 3:
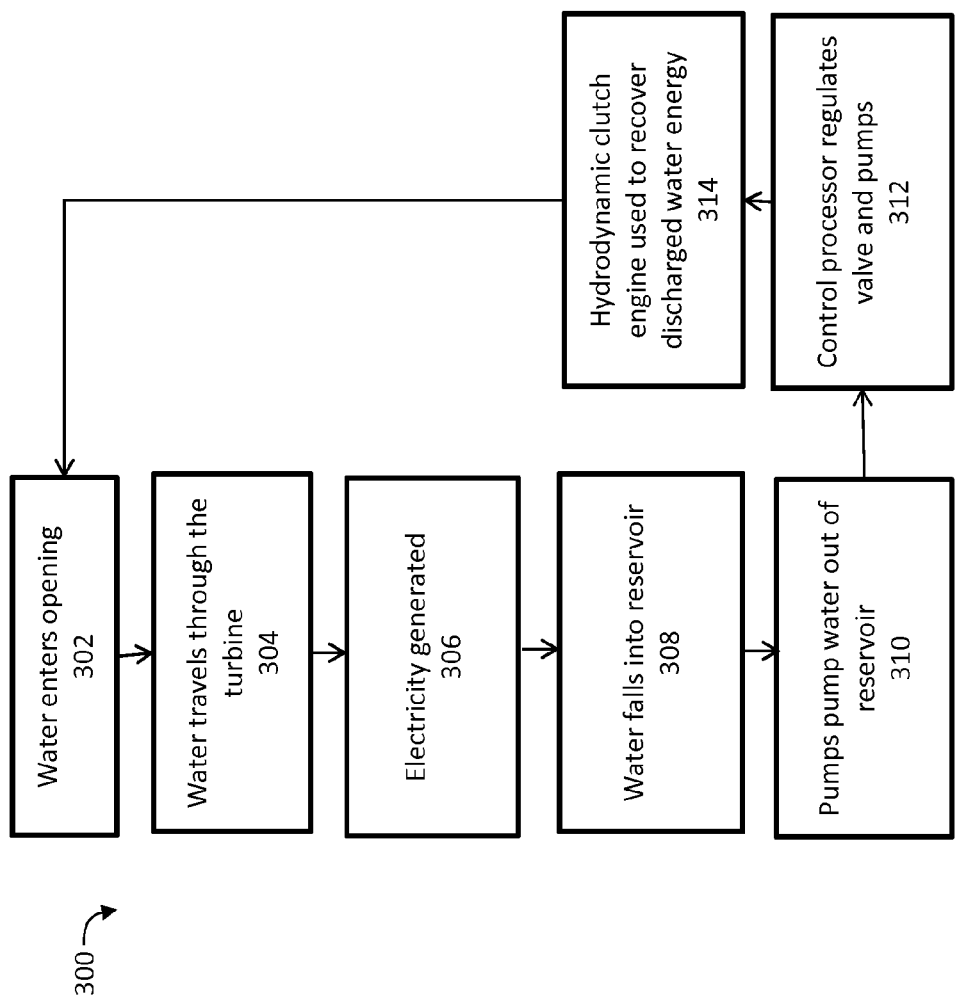
FIG. 3 is a flow chart depicting the method of the hydrodynamic energy generation system, in accordance with one embodiment.

FIG. 3 is a flow chart depicting the method 300 of the progressive hydrodynamic energy generation system 100, in accordance with one embodiment. In step 302, the water from the body of water enters the opening 102 of the system 100 and in step 304, the water travels through the water wheel and/or turbine 106. In step 306, the water wheel and/or turbine 106 turns, thereby driving the generator 107 and generating power or electricity. In step 208, the water that traveled through the water wheel and/or turbine 106 falls into the reservoir 120 through a virtual space where there may be no buoyancy forces opposing the gravity force that is driving the water flow. In step 310, the pumps 110, 112 (which may use power from external source 128) jettison water from the reservoir 120.

In step 312, the control processor 118 reads data from the first and second sensors 116, 117, generator 107, and turbine 106 and sends control signals to the valve 104 and the pumps 110, 112, wherein the control signals are configured to activate the valve 104 to regulate an amount of water that enters the opening 102 at the top of housing 108, and to activate the pumps 110, 112 to regulate an amount of water maintained in the reservoir 120, such that the system 100 is maintained at neutral buoyancy. The control signals sent to the valve 104 and the pumps 110, 112, may further be configured such that the amount of water 114 within reservoir 120 is not to be allowed to rise over a predefined line, for the purpose of substantially reducing or eliminating buoyancy forces acting on the system 100 due to the body of water in which the system 100 is submerged. The control signals sent to the valve 104 and the pumps 110, 112, may also be configured such that the amount of water being pumped out of the housing 108 is equal to or greater than the amount of water entering the housing 108 via the opening 102, so as to avoid a situation where the entire volume of housing 108 is filled with water.

In one embodiment, the control processor 118 receives data from the first and second sensors 116, 117, generator 107, and turbine 106 and uses a formula to calculate how much the valve 104 must be opened or closed, and how much the pumps 110, 112 must be adjusted in order to: 1) substantially reduce or eliminate buoyancy forces acting on the system 100, and/or 2) insure that the amount of water being pumped out of the housing 108 is equal to or greater than the amount of water entering the housing 108 via the opening 102. Based on said calculation, the processor 118 creates data commands to send to valve 104 and the pumps 110, 112, which are transmitted in step 312. In step 314, the discharged or jettisoned water may be managed to recover its hydrodynamic energy at a certain efficiency using a hydrodynamic clutch engine. Consequently, control flows back to step 302 where the entire process is executed again.

Following are a description of various alternative embodiments for the present invention. FIG. 1 shows a water wheel or turbine 106 that is mechanically coupled to a generator 107 that produces electrical power when the water wheel is moved by water that falls into the housing. In one alternative, (see FIG. 5) the water wheel or turbine 106 is mechanically coupled in a gear interface to a multi set system. The water wheel or turbine 106 may be mechanically coupled (such as via an axle) to a first set of gears including a large gear (or disk) 502 and a small gear (or disk) 504, wherein the small gear (or disk) 504 moves at a higher rotational speed to drive a second water pump 506. The water pump 506 may, for example, be a part of a closed system wherein water is pumped out of the reservoir 120 and directly to the opening 102 of the housing 108. The water pump 506 may operate at a higher capacity than the pumps 110, 112. The second water pump 506 may further power a second set of gears including a large gear 508 and a small gear 510, wherein the small gear 510 moves at a higher rotational speed. Subsequently, the small gear 510 drives another generator, another set of gears, another pump, etc. In one embodiment, various sets of gears may be chained in sequence to propagate power to other systems, pumps or sets of gears.

Figure 5:
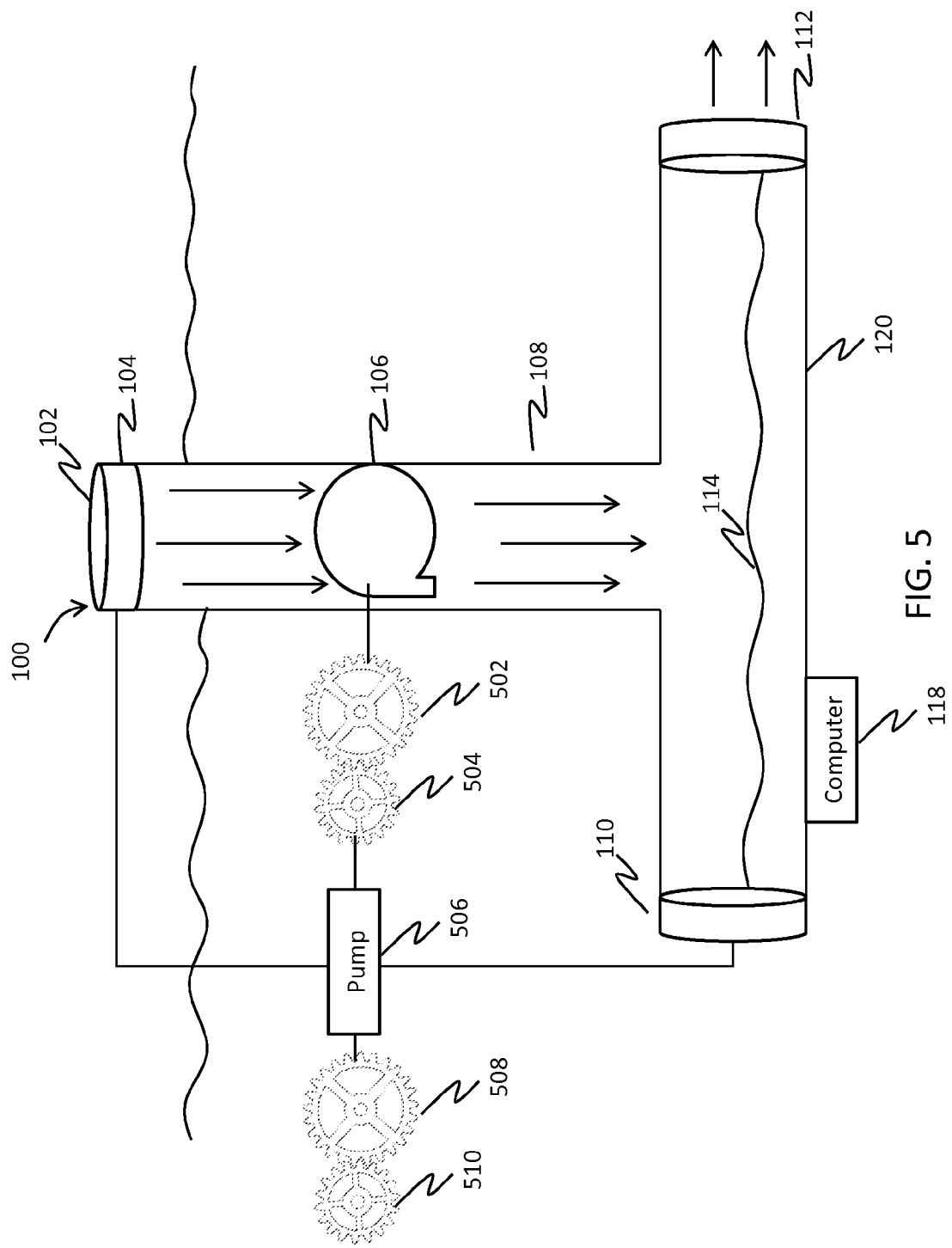
FIG. 5 is a block diagram illustrating the hydrodynamic energy generation system, in accordance with yet another alternative embodiment.
Figure 6:
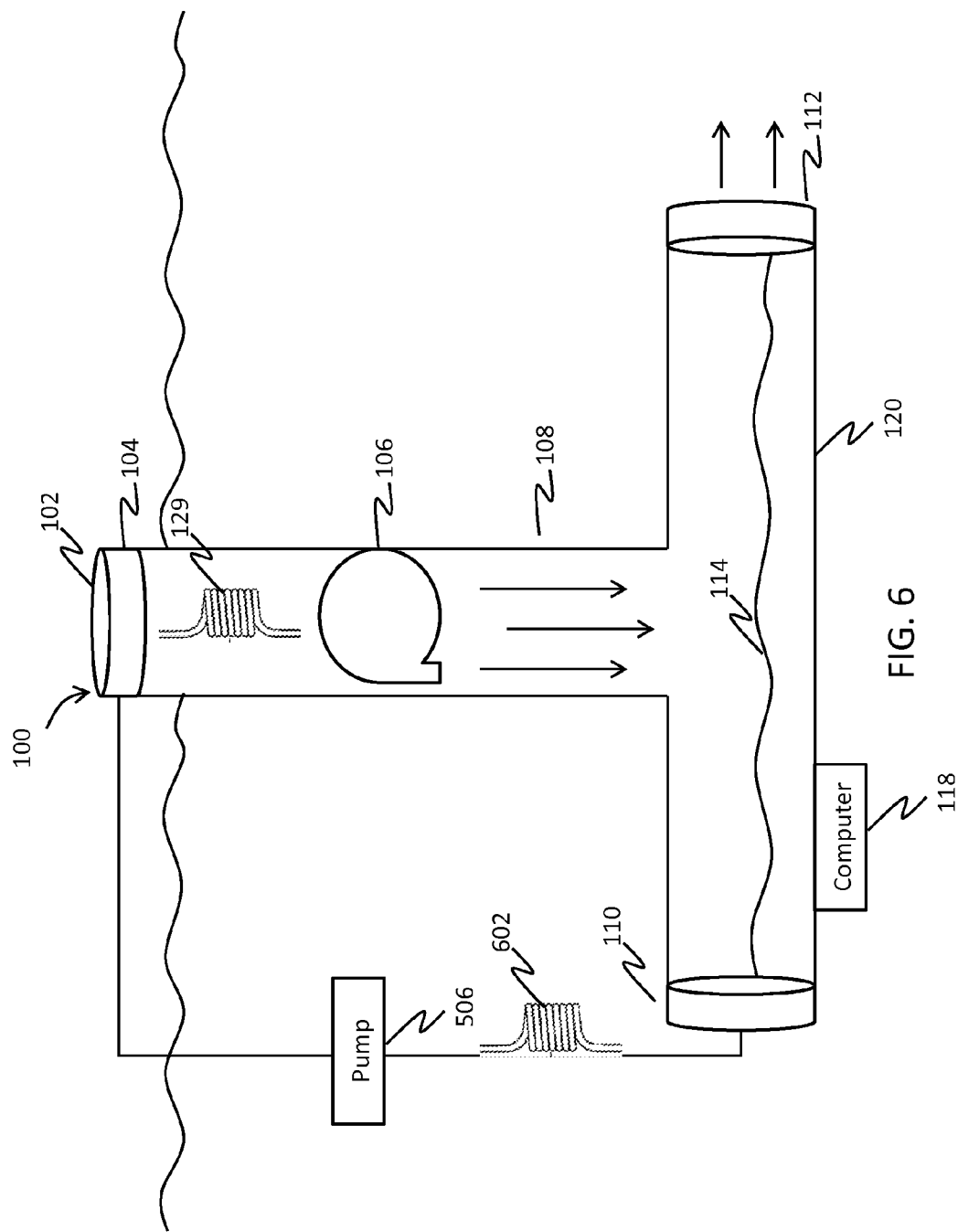
FIG. 6 is a block diagram illustrating the hydrodynamic energy generation system, in accordance with yet another alternative embodiment.

As shown in FIG. 5, the valve 104 may also be configured to be a continuation of a closed path or a closed circuit of water flow where the water entering the system 100 is being pumped directly from reservoir 120 via pump 506. In said configuration, the valve 104 may be located above the water line of the body of water in which the system 100 is submerged. One or more pumps may also be configured in position anywhere between the reservoir 12 and the valve 104.

In another alternative embodiment, the housing 108 may comprise multiple compartments or tubular structures that direct incoming water to different components. The multiple compartments or tubular structures are used to provide dedicates flowing water to specific components, such as specific pumps, turbines, water wheels or sensors.

In yet another alternative embodiment, the system 100 may include multiple such systems, including housings with various volumes of water and varying water speeds. Two systems may be configured to interface mechanically, using a gear, so that a turbine of one system may drive a pump of another system. Multiple systems may be configured separately so that the energy produced from one system is converted to electricity and used to drive a pump of another system.

In yet another alternative, (see FIG. 6) the housing 108 includes the vertically-aligned spiral tubular structure 129 located below the valve 104 at the top of the housing, as well as a vertically-aligned spiral tubular structure 602 located exterior to the housing 108. The water pump 506 may, for example, be a part of a closed system wherein water is pumped out of the reservoir 120 and directly to the opening 102 of the housing 108. The spiral tubular structure 602 provides a path for water being pumped out of the housing 108 and the spiral tubular structure 129 provides a path for water falling into the housing 108. The vertically-aligned spiral tubular structures 602, 129 may serve to accelerate and organized the water flow, such that the subject water may rotate and acquire more speed and/or torque as it travels through the spiral. In one embodiment, any of the gears, disks or the pumps 506, 110, 112 of FIG. 5 or 6 may be at least partially powered by external power source 128.

FIG. 7A is a block diagram illustrating the energy recovery and levering subsystem 700 of the hydrodynamic energy generation system 100, in accordance with an alternative embodiment. The energy recovery and levering subsystem 700 may be located within the hydrodynamic energy generation system 100. FIG. 7A shows that the subsystem includes a turbine 702 (connected to a generator or gear box) that is turned or otherwise moved by a jet of water or another liquid that has been jettisoned from a jet 712, which may be a water jet (or a variant of equivalent function, such as using pressurized steam or air in a dedicated and closed circuit within the system). The water jet 712 may shoot or jettison water from the reservoir 120 of the hydrodynamic energy generation system 100, or water from another location within system 100 or from an exterior location. The water jet 712 may shoot or jettison water that has been transferred to the jet via a pipe or conveyance mechanism 750, wherein movement of the water is provided by a pump 752. As the jettisoned water interacts with the turbine 702, the turbine rotates or moves and the connected generator thereby generates energy. The water jet 712 and turbine 702 may be located on a first level 760 of the hydrodynamic energy generation system 100.

The turbine 702 (and/or the connected generator) may be mechanically coupled, via a chain 722, with another water jet 714 located on another level 762. The term mechanically coupled refers to coupling one element with another element in such a way that mechanical or electrical energy can be transferred between the elements via a chain or elements. For example, a set of one or more rotating gears, one or more rotating shafts, one or more cams, one or more rotating shafts, or one or more belts (all referred to as a chain of elements) can mechanically couple the turbine 702 (and/or the connected generator) with the water jet 714 such that mechanical or electrical energy is translated from the turbine 702 (and/or the connected generator) to the jet 714. The energy provided by the turbine 702 (and/or the connected generator) provides energy to the jet 714 for performance of various tasks, such as movement of the jet, opening and closing of valves in the jet, adjustment of pressure of the water existing of jets, etc.

FIG. 7A also shows that the subsystem includes a turbine 704 (connected to a generator) that is turned or otherwise moved by water or another liquid that has been jettisoned from jet 714, which may be a water jet. The water jet 714 may shoot or jettison water from the reservoir 120 of the hydrodynamic energy generation system 100, or water from another location within system 100 or from an exterior location. The water jet 714 may shoot or jettison water that has been transferred to the jet via a pipe or conveyance mechanism 750 and pumped by pump 752. As the jettisoned water interacts with the turbine 704, the turbine rotates or moves and the connected generator thereby generates energy. The water jet 714 and turbine 704 may be located on a second level 762 of the hydrodynamic energy generation system 100. The turbine 704 (and/or the connected generator) may further be mechanically coupled, via a chain 724, with another water jet 716 located on another level.

FIG. 7A also shows that the subsystem includes a turbine 706 (connected to a generator or gear box) that is turned or otherwise moved by water or another liquid (or any media that may serve the same function, such as pressurized steam or air) that has been jettisoned from jet 716, which may be a water jet. The water jet 716 may shoot or jettison water from the reservoir 120 of the hydrodynamic energy generation system 100 or water from another location. The water jet 716 may shoot or jettison water that has been transferred to the jet via a pipe or conveyance mechanism 750 and pumped by pump 752. As the jettisoned water interacts with the turbine 706, the turbine rotates or moves and the connected generator thereby generates energy. The water jet 716 and turbine 706 may be located on a third level 764 of the hydrodynamic energy generation system 100. In one embodiment, any of the water jets or the pump 752 of FIG. 7A may be at least partially powered by external power source 128.

Figure 7B:
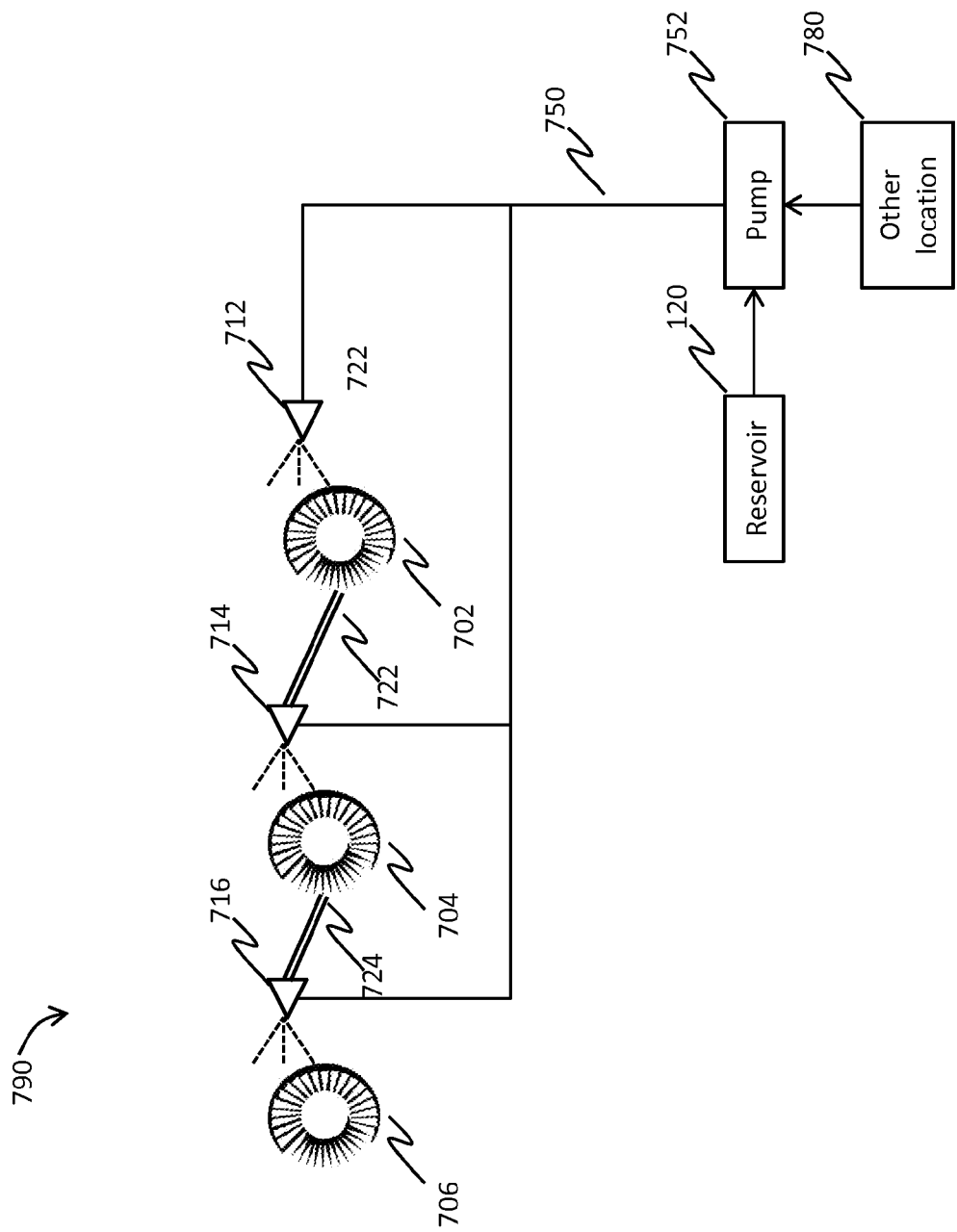
FIG. 7B is a block diagram illustrating an alternative energy recovery and levering subsystem of a hydrodynamic energy generation system, in accordance with an alternative embodiment.

FIG. 7B is a block diagram illustrating an alternative energy recovery and levering subsystem 790 of a hydrodynamic energy generation system 100, in accordance with an alternative embodiment. Whereas FIG. 7A shows an energy recovery and levering subsystem 700 arranged in a vertical fashion, FIG. 7B shows an energy recovery and levering subsystem 790 arranged in a horizontal fashion.

The energy recovery and levering subsystem 790 may be located within the hydrodynamic energy generation system 100. FIG. 7B shows that the subsystem includes a turbine 702 (connected to a generator) that is turned or otherwise moved by a jet of water or another liquid that has been jettisoned from a jet 712. The water jet 712 may shoot or jettison water from the reservoir 120 of the hydrodynamic energy generation system 100, or water from another location 780 within system 100 or from an exterior location. The water jet 712 may shoot or jettison water that has been transferred to the jet via a pipe or conveyance mechanism 750, wherein movement of the water is provided by a pump 752. As the jettisoned water interacts with the turbine 702, the turbine rotates or moves and the connected generator thereby generates energy. The turbine 702 (and/or the connected generator) may be mechanically coupled, via a chain 722, with another water jet 714 located on another level 762. The energy provided by the turbine 702 (and/or the connected generator) provides energy to the jet 714 for performance of various tasks.

FIG. 7B also shows that the subsystem includes a turbine 704 (connected to a generator) that is turned or otherwise moved by water or another liquid that has been jettisoned from jet 714. The water jet 714 may shoot or jettison water from the reservoir 120 or water from another location 780 within system 100 or from an exterior location. The water jet 714 may shoot or jettison water that has been transferred to the jet via a pipe or conveyance mechanism 750 and pumped by pump 752. As the jettisoned water interacts with the turbine 704, the turbine rotates or moves and the connected generator thereby generates energy. The turbine 704 (and/or the connected generator) may further be mechanically coupled, via a chain 724, with another water jet 716 located on another level.

FIG. 7B also shows that the subsystem includes a turbine 706 (connected to a generator) that is turned or otherwise moved by water or another liquid that has been jettisoned from jet 716. The water jet 716 may shoot or jettison water from the reservoir 120 or water from another location 780. The water jet 716 may shoot or jettison water that has been transferred to the jet via a pipe or conveyance mechanism 750 and pumped by pump 752. As the jettisoned water interacts with the turbine 706, the turbine rotates or moves and the connected generator thereby generates energy. In one embodiment, the subsystem 790 may be used for other types of energy usage, such as electricity generation, or levering the hydrodynamic energy produced by itself, such as variations in speed and volume due to pump usage. In another embodiment, the generator attached to turbine 706 operates in energy recovery mode so as to recover energy from the subsystem 790. In one embodiment, the subsystem 790 may include a valve that regulates the source of the water fed to jets 712, 714, 716. The valve may be used to regulate when and how much water is fed to the water jets from the reservoir 120 of the hydrodynamic energy generation system 100, or from another location 780 within system 100 or from an exterior location. In one embodiment, any of the water jets or the pump 752 of FIG. 7B may be at least partially powered by external power source 128.

Figure 8:
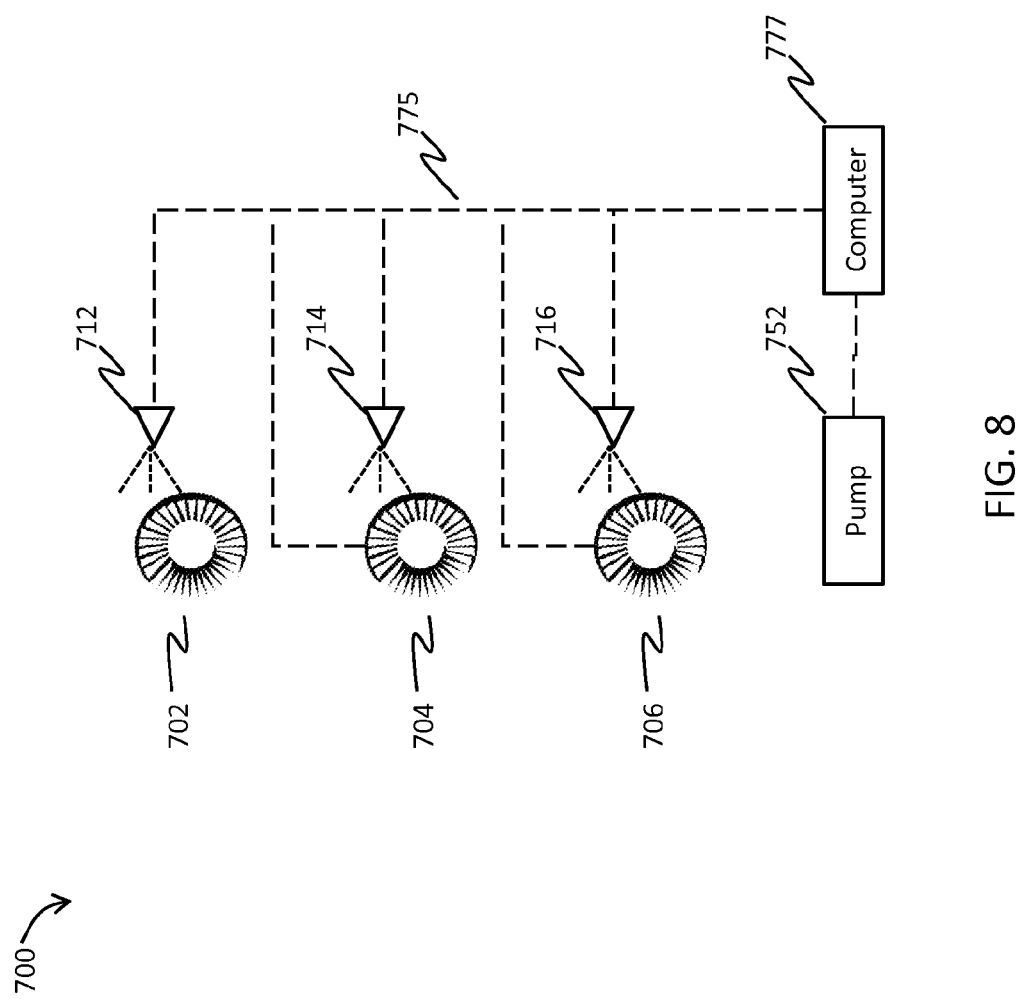
FIG. 8 is a block diagram illustrating how the energy recovery and levering subsystem of FIG. 7A of the hydrodynamic energy generation system is coupled with a computer system, in accordance with the alternative embodiment

FIG. 8 is a block diagram illustrating how the energy recovery and levering subsystem 700 of the hydrodynamic energy generation system 100 is coupled with a computer system 777, in accordance with the alternative embodiment. As shown in FIG. 8, the computer 777 may be communicatively coupled with pump 752, turbines 702, 704, 706 (and/or the attached generators) and jets 712, 714 and 716. In one embodiment, processor 777 may be a central processing unit, microprocessor, integrated circuit, programmable device or computing device, as defined below with reference to FIG. 4. The control processor 777 is configured for reading data from the pump 752, turbines 702, 704, 706 (and/or the attached generators) and jets 712, 714 and 716 (as well as from computer 118 or any components from which computer 118 collects data) and sending control signals to the pump, turbines and jets. The control processor 777 may read electrical output, wattage and/or workload data from the turbines 702, 704, 706 (and/or the attached generators), may read the pressure and amount of water exiting the jets 712, 714 and 716, as well the position or orientation of the jets 712, 714 and 716, and may read output, wattage and/or workload data from the pump 752.

The control processor 777 is further configured for sending control signals to the pump, turbines and jets, wherein the control signals are configured to move the jets, activate any valves in the jets to regulate an amount of water that exits the jets, activate any valves in the jets to regulate pressure of water that exits the jets, and to activate the pump to regulate an amount of water transferred to the jets. The control signals sent to the pump, jets and turbines may further be configured such that the amount of water 114 within reservoir 120 is not to be allowed to rise over a predefined line, for the purpose of substantially reducing or eliminating buoyancy forces acting the system 100 due to the body of water in which the system 100 is submerged. The control signals sent to the pump, jets and turbines, may also be configured such that the turbines and connected generators output a desired or predefined amount of energy. In one embodiment, any of the water jets or the pump 752 of FIG. 8 may be at least partially powered by external power source 128.

Figure 9:
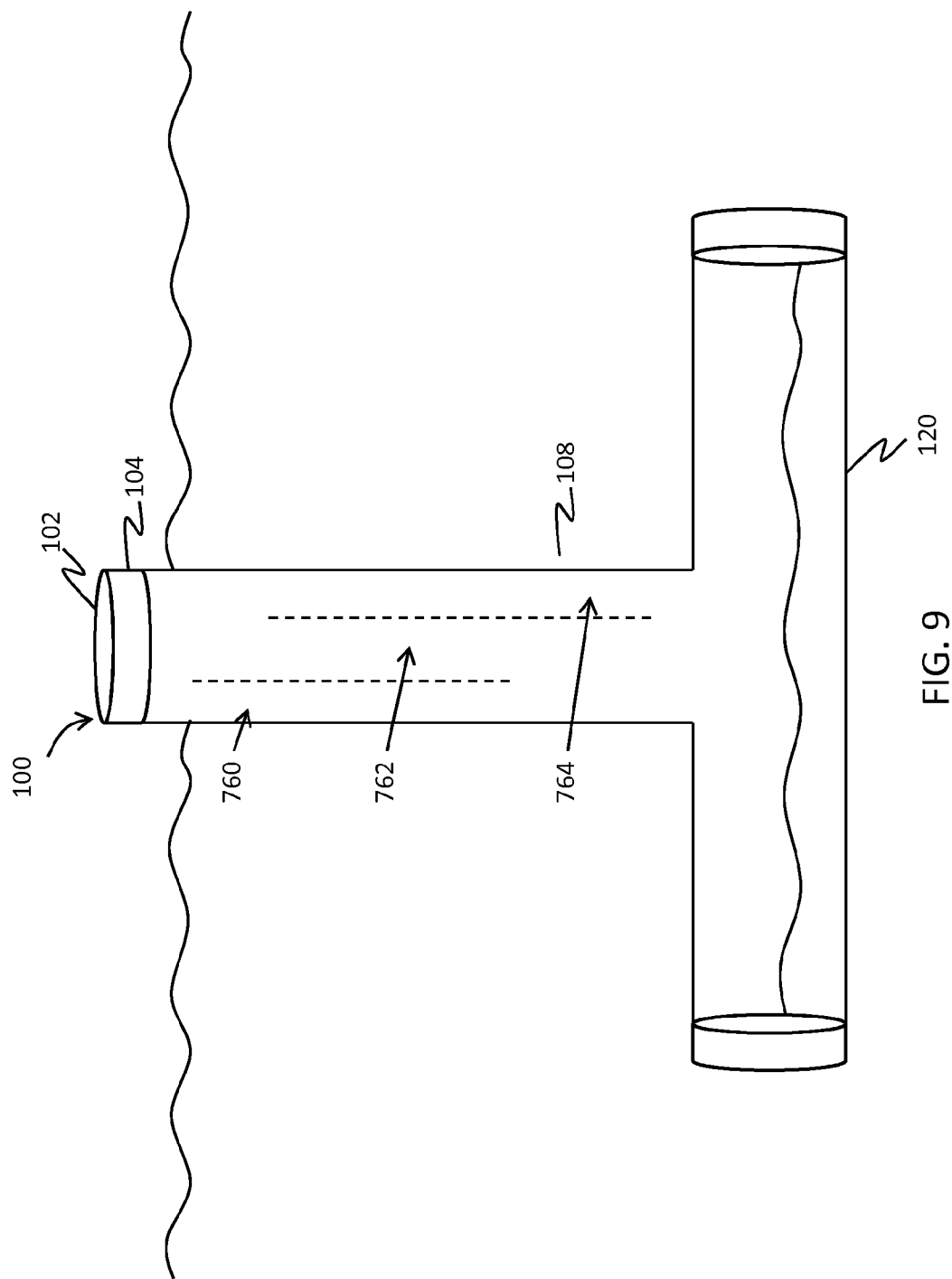
FIG. 9 is a block diagram illustrating the location of the energy recovery and levering subsystem of FIG. 7A within the hydrodynamic energy generation system, in accordance with the alternative embodiment.

FIG. 9 is a block diagram illustrating the location of the energy recovery and levering subsystem 790 within the hydrodynamic energy generation system 100, in accordance with the alternative embodiment. As explained above, the water jet 712 and turbine 702 may be located on a first level 760 of the hydrodynamic energy generation system 100, the water jet 714 and turbine 704 may be located on a second level 762 of the hydrodynamic energy generation system 100, and the water jet 716 and turbine 706 may be located on a third level 764 of the hydrodynamic energy generation system 100. Note that although the figure shows the levels 760, 762 and 764 in a horizontal arrangement, the invention supports a vertical arrangement for the levels 760, 762 and 764, or any combination of spatial arrangements for levels 760, 762 and 764.

Figure 10A:
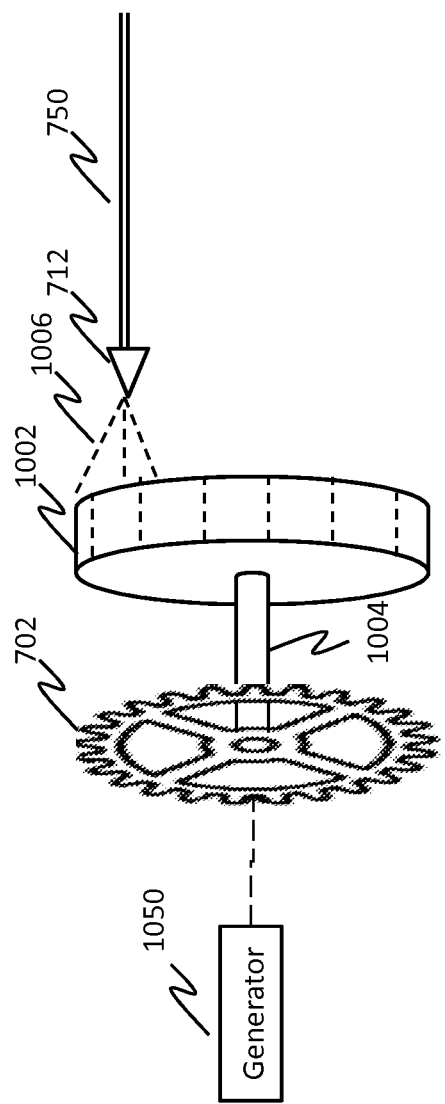
FIG. 10A is a block diagram illustrating a turbine and water wheel of the energy recovery and levering subsystem of the hydrodynamic energy generation system, in accordance with yet another alternative embodiment.

FIG. 10A is a block diagram illustrating a turbine 702 and water wheel 1002 of the energy recovery and levering subsystem 700 of the hydrodynamic energy generation system 100, in accordance with yet another alternative embodiment. FIG. 10 provides more detail on each turbine shown in FIGS. 7A and 7B, including additional components not shown in FIGS. 7A and 7B. FIG. 10 shows that the turbine 702 may be connected to a water wheel 1002 concentric with the turbine 702, via a shaft 1004 extending along the centerline of the turbine 702 and water wheel 1002. The water jet 712 expels a water stream 1006 (or another liquid) at high speed towards the water wheel 1002, which rotates or turns, thereby moving the shaft 1004, and moving the turbine 702. A generator 1050 is coupled to the turbine 702 such that movement of the turbine 702 results in the generator 1050 generating energy.

Water jet 712, which may comprise a nozzle, may rotate or change its position or orientation so as to change how the water 1006 (or other liquid it expels) hits or interacts with the water wheel 1002. In one example, the water jet 712 may rotate or change its position or orientation such that the water stream 1006 hits or interacts with the water wheel 1002 near the outer circumference of the water wheel 1002, so as to maximize the torque experienced by the water wheel 1002 as a result of the impact of the water stream 1006. In another example, the water jet 712 may rotate or change its position or orientation such that the water stream 1006 hits or interacts with the water wheel 1002 near the center of the water wheel 1002, so as to minimize the torque experienced by the water wheel 1002 as a result of the impact of the water stream 1006. As explained above, the control processor 777 is configured for sending control signals to the water jets, wherein the control signals are configured to move the jets (i.e., their positions orientations or rotations), activate any valves in the jets to regulate an amount of water that exits the jets, and activate any valves in the jets to regulate pressure of water that exits the jets. This allows the control processor 777 to control or manage how much energy is produced by the generator 1050.

Figure 10B:
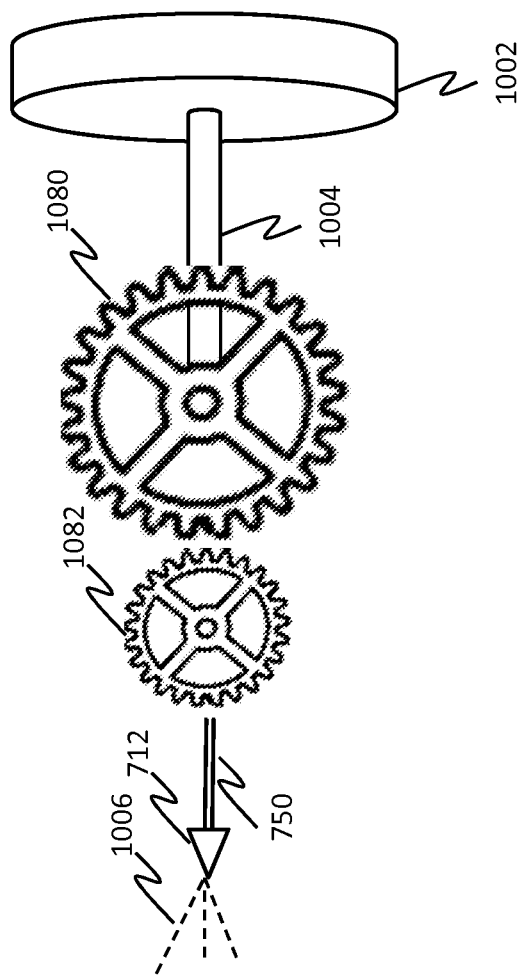
FIG. 10B is a block diagram illustrating a gear system of the energy recovery and levering subsystem of the hydrodynamic energy generation system, in accordance with yet another alternative embodiment.

FIG. 10B is a block diagram illustrating a gear system of the energy recovery and levering subsystem 700 or 790 of the hydrodynamic energy generation system 100, in accordance with yet another alternative embodiment. FIG. 10B provides more detail on each chain shown in FIGS. 7A and 7B, including additional components not shown in FIGS. 7A and 7B. FIG. 10B shows that the large disk or gear 1080 may be connected to a water wheel 1002 concentric with the gear 1080, via a shaft 1004 extending along the centerline of the gear 1080 and water wheel 1002. FIG. 10B shows that the gear 1080 may drive a small disk or gear 1082, which is further chained or otherwise mechanically coupled (via a chain 750) with the water jet 712, which jettisons water 1006. The water jet 712 expels a water stream 1006 (or another liquid). A generator (not shown) may be coupled to the jet 712 such that movement of the turbine of the generator results in the generator generating energy. Gears such as those shown in FIG. 10B can be used to connect multiple sets. In one embodiment, the gears such as those shown in FIG. 10B (or the gears within chain 750) can be housed in a housing that includes lubricating fluids.

Based on the relative difference in the size of the gears 1080 and 1082, the pump speed of the jet 716 is increased over the speed of the jet 714, which further has a speed that is increased over the speed of the jet 712 (see FIGS. 7A and 7B). In one embodiment, the water jet 712 of FIG. 10A or 10B may be at least partially powered by external power source 128.

Figure 4:
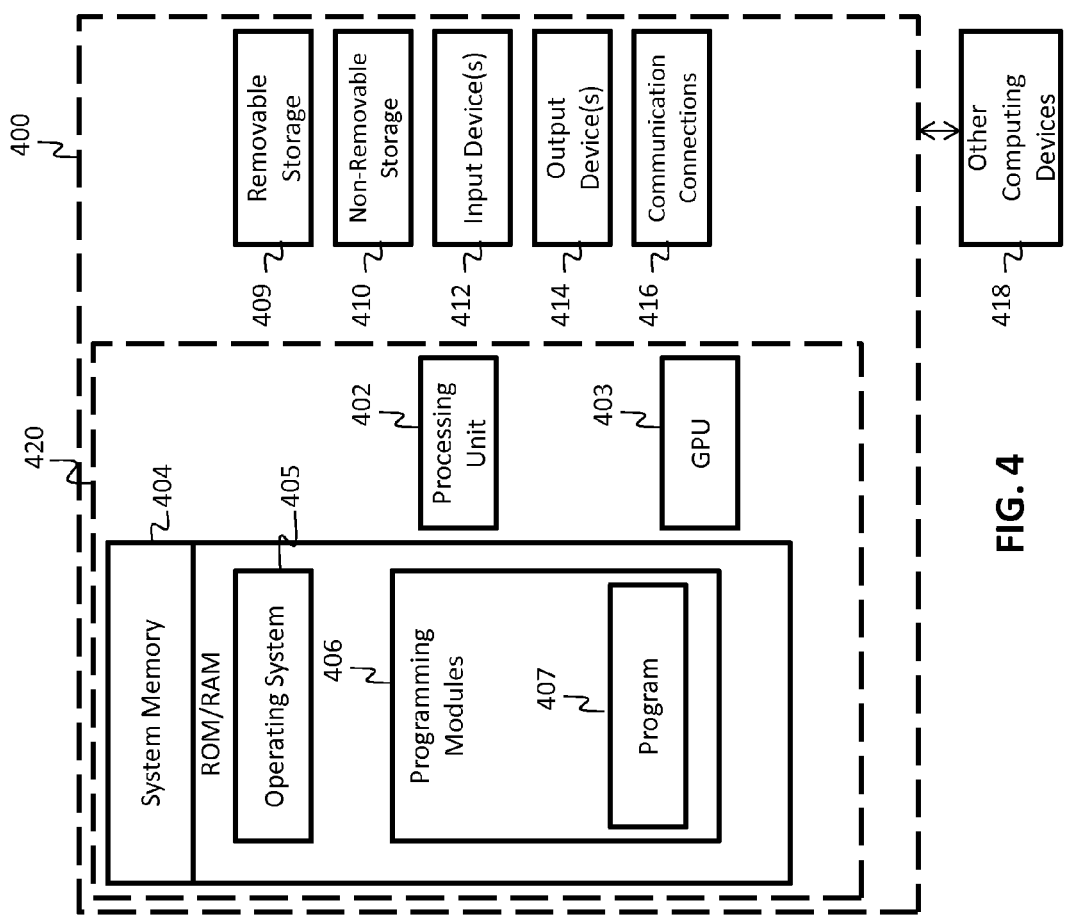
FIG. 4 is a block diagram of a system including an example computing device and other computing devices.

FIG. 4 is a block diagram of a system including an example computing device 400 and other computing devices. Consistent with the embodiments described herein, the aforementioned actions performed by computer 118 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for the method shown in FIG. 3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 may perform processes including, for example, one or more of the methods shown in FIG. 3 above. Computing device 402 may also include a graphics processing unit 403, which supplements the processing capabilities of processor 402 and which may execute programming modules 406, including all or a portion of those processes and methods shown in FIG. 3 above. The aforementioned processes are examples, and processing units 402, 403 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A hydrodynamic energy generation system, comprising:
a vertically aligned housing comprising a hollow interior and an opening at a top, wherein the housing is at least partially submerged in a body of water;
a valve coupled to a top of the housing for regulating an amount of water that enters the opening at the top and falls into the housing, wherein the valve is located at or under a water line;
a first water wheel located below the valve and within the housing, wherein the first water wheel is mechanically coupled to a first generator that produces electrical power when the first water wheel is moved by water that falls into the housing;
a reservoir located below the first water wheel and within the housing, wherein the reservoir holds the water that has travelled via the first water wheel;

at least one pump for removing water from the reservoir, wherein the at least one pump is at least partially powered by an external power source;
a first water jet for receiving water from the at least one pump and jettisoning water towards the first water wheel, so as to move the first water wheel and cause the first generator to produce electrical power, wherein the first water jet is at least partially powered by the external power source;
a coupling for conductively coupling the hydrodynamic energy generation system with the external power source
a second water wheel located below the first water wheel and within the housing, wherein the second water wheel is mechanically coupled to a second generator or gear box that produces electrical or mechanical rotational power when the second water wheel is moved;
a second water jet for receiving water from the at least one pump and jettisoning water towards the second water wheel, so as to move the second water wheel and cause the second generator to produce electrical power; and
a mechanical chain between the first generator or first gear box and the second water jet, such that the first generator provides power to the second water jet via the mechanical chain.

2. The hydrodynamic energy generation system of claim 1, further comprising:
a third water wheel located below the second water wheel and within the housing, in a dedicated compartment, wherein the third water wheel is mechanically coupled to a third generator that produces rotational mechanical power when the third water wheel is moved.

3. The hydrodynamic energy generation system of claim 2, further comprising:
a third water jet for receiving water from the at least one pump and jettisoning water towards the third water wheel, so as to move the third water wheel and cause the third generator to produce electrical power; and
a mechanical chain between the second gear box and the third water jet, such that the second gear box provides rotational power to the third water jet via the mechanical chain.

4. The hydrodynamic energy generation system of claim 3, further comprising a first sensor for detecting water flow through the housing.

5. The hydrodynamic energy generation system of claim 4, further comprising a second sensor for detecting the amount of water in the reservoir.

6. The hydrodynamic energy generation system of claim 5, further comprising a control processor communicatively coupled with the valve, the at least one pump, the first and second sensors, the first, second and third water jets and the first, second and third generators.

7. The hydrodynamic energy generation system of claim 6, wherein the control processor is configured for:
reading data from the first and second sensors;
sending control signals to the valve and the at least one pump, wherein the control signals are configured to adjust the valve to regulate an amount of water that enters the opening at the top, and to activate the at least one pump to regulate an amount of water maintained in the reservoir;
reading data from the first, second and third generator or gear box; and
sending control signals to the first, second and third water jets, wherein the control signals are configured to adjust one or more of the following for each water jet: an amount of water jettisoned, a rate of water jettisoned, a pressure of water jettisoned, an angle of rotation of the water jet and a position of the water jet.

8. The hydrodynamic energy generation system of claim 7, wherein the reservoir comprises a volume that extends horizontally past a horizontal width of the housing.

9. A hydrodynamic energy generation system, comprising:
a vertically aligned housing comprising a hollow interior and an opening at a top, wherein the housing is at least partially submerged in a body of water;
a valve coupled to a top of the housing for regulating an amount of water that enters the opening at the top and falls into the housing, wherein the valve is located at or under a water line;
a first water wheel located below the valve and within the housing, wherein the first water wheel is mechanically coupled to a first generator or gear box that produces rotational mechanical power when the first water wheel is moved by water that falls into the housing, and wherein the first water wheel is further coupled via a shaft to a large gear that drives a smaller gear, such that when the first water wheel rotates, the shaft rotates the large gear, which rotates the smaller gear;
a reservoir located below the first water wheel and within the housing, wherein the reservoir holds the water that has travelled via the first water wheel;
at least one pump for jettisoning water from the reservoir, wherein the at least one pump is at least partially powered by an external power source;
a first water jet for receiving water from the at least one pump and jettisoning water towards the first water wheel, so as to move the first water wheel and cause the first generator to produce electrical power or the first gear box to produce mechanical rotational power;
a second water jet mechanically coupled to the smaller gear, such that the smaller gear provides power to the second water jet, wherein the first water jet is at least partially powered by the external power source;
a control processor coupled with the valve, the at least one pump, the first generator and the first and second water jet, the control processor for controlling said valve, the at least one pump and the first and second water jets; and
a coupling for conductively coupling the hydrodynamic energy generation system with the external power source.

10. The hydrodynamic energy generation system of claim 9, further comprising:
a second water wheel located below the first water wheel and within the housing, in a dedicated compartment, wherein the second water wheel is mechanically coupled to a second gear box or generator that produces rotational power when the second water wheel is moved.

11. The hydrodynamic energy generation system of claim 10, wherein the second water jet receives water from the at least one pump and jettisons water towards the second water wheel, so as to move the second water wheel and cause the second gear box or generator to produce mechanical rotational power.

12. The hydrodynamic energy generation system of claim 11, further comprising:
a third water wheel located below the second water wheel and within the housing in a dedicated compartment, wherein the third water wheel is mechanically coupled to a third gear box or generator that produces mechanical rotational power when the third water wheel is moved.

13. The hydrodynamic energy generation system of claim 12, further comprising:

a third water jet for receiving water from the at least one pump and jettisoning water towards the third water wheel, so as to move the third water wheel and cause the third gear box or generator to produce mechanical rotational power; and a mechanical chain between the second generator and the third water jet, such that the second gear box or generator provides power to the third water jet via the mechanical chain.

14. The hydrodynamic energy generation system of claim 13, further comprising a first sensor for detecting water flow through the housing.

15. The hydrodynamic energy generation system of claim 14, further comprising a second sensor for detecting the amount of water in the reservoir.

16. The hydrodynamic energy generation system of claim 15, wherein the control processor is further communicatively coupled with the first and second sensors, the second and third water jets and the second and third generators.

17. The hydrodynamic energy generation system of claim 16, wherein the control processor is configured for:
   reading data from the first and second sensors;
   sending control signals to the valve and the at least one pump, wherein the control signals are configured to adjust the valve to regulate an amount of water that enters the opening at the top, and to activate the at least one pump to regulate an amount of water maintained in the reservoir;
   reading data from the first, second and third generators; and
   sending control signals to the first, second and third water jets, wherein the control signals are configured to adjust one or more of the following for each water jet: an amount of water jettisoned, a rate of water jettisoned, a pressure of water jettisoned, an angle of rotation of the water jet and a position of the water jet.

18. A hydrodynamic energy generation system, comprising:

a vertically aligned housing comprising a hollow interior and an opening at a top, wherein the housing is at least partially submerged in a body of water;

a valve coupled to a top of the housing for regulating an amount of water that enters the opening at the top and falls into the housing, wherein the valve is located at or under a water line;

a first water wheel located below the valve and within the housing, wherein the first water wheel is mechanically coupled to a first gear box or generator that produces mechanical rotational power when the first water wheel is moved by water that falls or moves into the housing;

a reservoir located below the first water wheel and within the housing, wherein the reservoir holds the water that has travelled via the first water wheel;

at least one pump for jettisoning water from the reservoir, wherein the at least one pump is at least partially powered by an external power source;

a first water jet for receiving water from the at least one pump and jettisoning water towards the first water wheel, so as to move the first water wheel and cause the first gear box or generator to produce mechanical rotational power, wherein the first water jet includes a movable head such that the water jettisoned toward the first water wheel may contact different places on the water wheel, and wherein the first water jet is at least partially powered by the external power source;

a control processor coupled with the valve, the at least one pump, the first generator and the first water jet, the control processor for controlling said valve, the at least one pump and the first water jet, wherein the control processor controls the movable head of the first water jet such that the water jettisoned toward the first water wheel may contact different places on the water wheel; and a coupling for conductively coupling the hydrodynamic energy generation system with the external power source.

* * * * *